July 14, 1936.　　S. I. VAUGHN ET AL　　2,047,341
METHOD OF RIVETING
Filed July 19, 1934　　2 Sheets-Sheet 1

INVENTOR.
STANLEY I. VAUGHN
BY EDWIN N. FABING
ATTORNEYS.

July 14, 1936.     S. I. VAUGHN ET AL     2,047,341
METHOD OF RIVETING
Filed July 19, 1934     2 Sheets-Sheet 2

INVENTOR.
STANLEY I. VAUGHN and
EDWIN N. FABING.
BY
ATTORNEYS.

Patented July 14, 1936

2,047,341

UNITED STATES PATENT OFFICE 2,047,341

METHOD OF RIVETING

Stanley I. Vaughn and Edwin N. Fabing, Kenmore, N. Y., assignors to Curtiss Aeroplane & Motor Company, Inc., a corporation of New York Application July 19, 1934, Serial No. 735,970

2 Claims. (Cl. 78—54)

This invention relates to riveting joints, and is particularly concerned with a novel method for flush riveting thin sheet metal members such as are used in the fabrication of aircraft parts.

The method of the invention is particularly concerned with a simplified process for press counter-sinking the thin sheet metal adjacent rivet holes, and provides alternative methods of utilizing the rivet in the press counter-sinking operation. One method involves the use of a flat head rivet having a conical portion joining the flat head and the rivet shank, such a rivet head being adapted to enter into the counter-sunk portion of the sheets, the opposite end of the rivet being peened or pressed to hold the sheets securely together. Another method contemplates the use of an oval head rivet and a forming tool having an arcuate recess into which the oval rivet head is adapted to be driven. The rivet head is thus deformed in such manner that the inner face of the head is of concave conical shape, and into this conical recess, portions of the thin metal sheets are adapted to be driven. Thus, by continued driving of the rivet, a counter-sink is formed on the surface of the metal opposite the rivet head, and the rivet shank is driven into this counter-sink. Still another alternative provides for the use of rivets having an oval head with a concave conical interior head portion into which the sheet metal surrounding the rivet shank may be deformed to form a counter-sink. Thereafter, the rivet shank is driven into the counter-sink.

In any one of the methods, the operation of counter-sinking and driving the rivet are to all intents and purposes simultaneous, eliminating the necessity for pre-forming the counter-sunk portions in the metal sheets and permitting complete counter-sinking and riveting of the sheets upon assembly without the necessity for pre-forming operations.

Objects of the invention are to provide a simplified method for riveting thin metal sheets; to provide a novel method for effecting flush riveted joints in thin sheet metal; to provide a method for effecting flush riveted joints in substantially a single operation. Further objects will be apparent in reading the annexed specification and claims, and in examining the drawings, in which:

Figure 1:
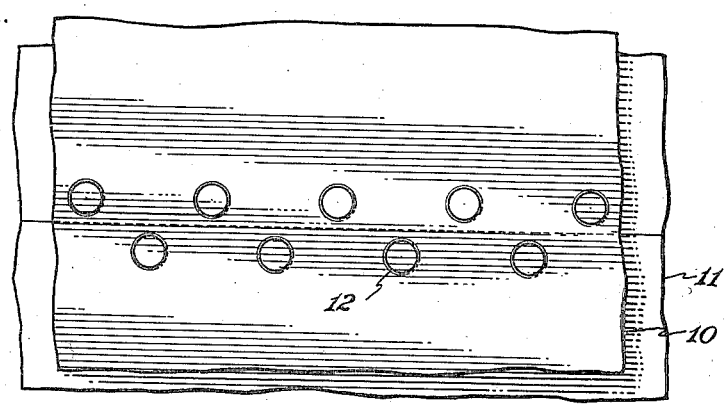
Fig. 1 is a plan of portions of metal sheets riveted in accordance with the method of this invention.
Figures 2, 3:
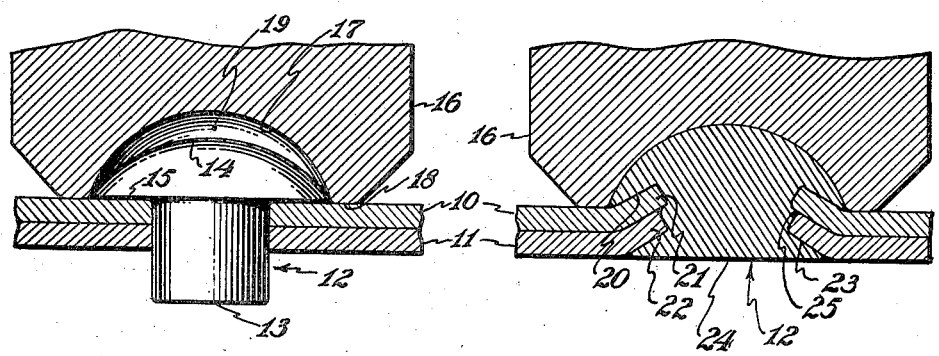
Fig. 2 is a cross section through a pair of metal sheets in one of the initial stages of the riveting operation.
Fig. 3 is a section through the metal sheets, the rivet and a forming tool at the end of the riveting operation.

In the figures, 10 and 11 represent a pair of thin metal sheets adapted to be joined by riveting. Upon juxtaposition of the sheets, a hole is drilled through them and into this hole a rivet is inserted. Figs. 2 and 3 show the first form and method of riveting wherein the rivet 12 comprises a shank 13 having an oval head 14, the inner surface 15 of the head being flat, and being initially adjacent the sheet 10. A forming tool 16 is provided with an arcuate recess 17 having a diameter adjacent the face 18 of the tool equal to the diameter of the rivet head 14. The recess 17, however, is struck on a lesser radius than that of the head 14, whereby initially, a crescent-shaped space 19 is left between the rivet head and the surface of the recess 17. A flat faced rivet hammer of conventional type is then applied to the end of the shank 13 and the driving operation is initiated. The first stage of the driving operation will press the rivet head 14 upwardly into engagement with the surface of the recess 17, simultaneously deforming the inner head face 15 to a concave conical shape as shown in Fig. 3 at 20. Continued driving of the rivet will start to head over the end of the shank 13 whereupon the edges 21 and 22 of the sheets 10 and 11, surrounding the rivet hole, will be pressed upwardly to lie adjacent the concave conical surface 20. Thereupon, counter-sunk portions 23 are formed in the sheets, continued driving of the rivet shank 13 flowing the shank metal into the counter-sink so that when completed, the bottom face 24 of the rivet lies flush with the bottom face of the sheet 11. As the rivet shank is driven, the upset sheet edges will bite into the rivet shank and certain portions of the material will be extruded to fill the crevices between the upset edges of the sheets 10 and 11, as at 25, so that when completed, the rivet completely occupies all crevices and spaces between the sheets. It will be noted that by virtue of the shape of the rivet head 14 and the forming tool 16, that in the completed joint, the rivet head completely encloses the counter-sunk portions of the sheets 10 and 11.

Figure 4:
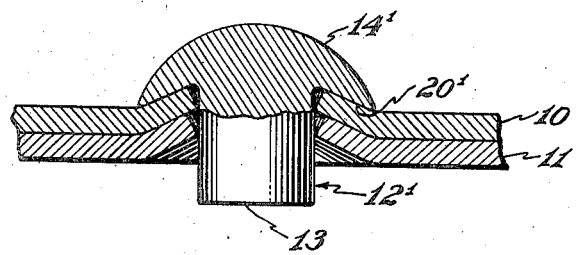
Fig. 4 is a section through a pair of metal sheets and a rivet of alternative form.
Figure 5:
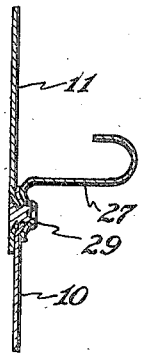
Fig. 5 is a section through a riveted joint of alternative construction.
Figure 6:
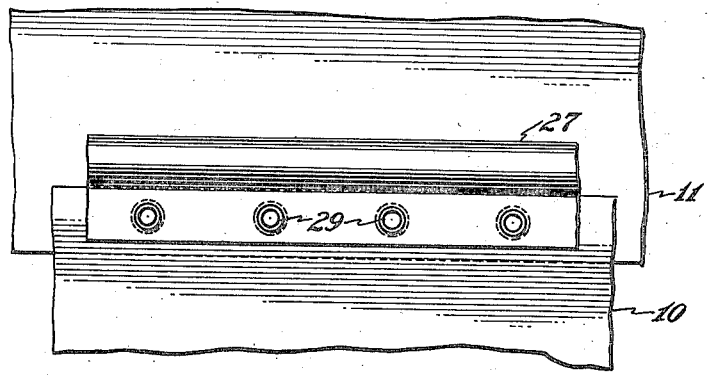
Fig. 6 is a plan of metal sheets joined in the same manner as those of Fig. 5.

Fig. 4 shows an alternative form of rivet 12', wherein the head 14' is pre-formed with a concave conical inner face 20'. In effecting a riveted joint with this rivet, the rivet is inserted as before in the holes through the sheets 10 and 11, and a counter-sinking tool may be applied against the bottom surface of the sheet 11 adjacent the rivet shank 13, to press the sheets 10 and 11 upwardly into the concave portion of the rivet head 20', the head being backed up by a bucking bar having a recess complementary to the rivet head. Thereafter, the rivet shank may be headed as before, to flow the metal into the counter-sink and into the spaces and crevices resultant from the counter-sinking of the sheets. An alternative method of applying the rivet of Fig. 4 would be to omit the operation of applying a counter-sinking tool, and rather, to apply the rivet hammer to the end of the shank 13, while bucking the rivet head 14', whereupon the shank 13 will begin to head and will force the edges of the sheets 10 and 11 into the conical concave portion of the rivet head 14' in the same manner as was accomplished in the embodiment shown in Figs. 2 and 3. The final form of rivet joint produced by the method illustrated in Fig. 4 will be identical with that of Figs. 2 and 3.

Figure 7:
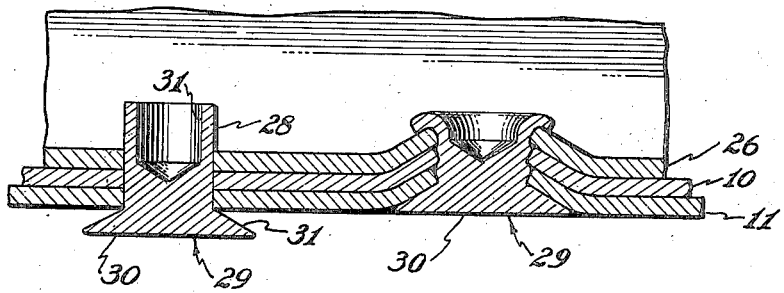
Fig. 7 is an enlarged section through one of the joints of Figs. 5 and 6 showing rivets in successive stages of being driven.
Figure 8:
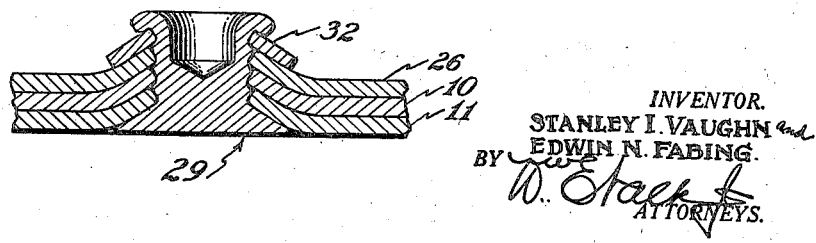
Fig. 8 is a section through an alternative form of riveted joint.

Figs. 7 and 8 show another alternative method of effecting a flush riveted joint wherein the sheets 10 and 11, augmented by a flange 26 of a brace member 27 are assembled in their proper relation and are drilled for rivets. Preferably, the rivets used in this type of joint are of somewhat harder material than the sheet metal material, and comprise a shank 28 having a head 29, the top face 30 of which is flat, and the inner portion of which is of conical form as at 31. In using a hard rivet it is preferable to provide a bore 31 in the end of the rivet shank to ease the heading of the rivet.

Upon insertion of the rivet, a bucking tool is applied over the rivet shank 28 and against the sheet 10, after which a flat faced hammer or the like is applied to the flat face 30 of the rivet. The initial driving of the rivet will deform the edges of the sheets 10, 11 and 26 in complement to the conical face 31 of the rivet, the edges biting into the rivet shank, this being shown on the right hand side of Fig. 7. When the sheet portions are fully deformed in complement to the conical rivet face 31, the rivet face 30 will lie flush with the lower surface of the sheet 11. Thereafter, or during the counter-sinking operation, the rivet shank may be headed outwardly to overlap and firmly clamp the top edge of the sheet 26, the joint being then completed. During the process of heading the rivet, the material of the rivet shank 28 will flow into the crevices previously formed by the counter-sinking operation.

A unitary tool for effecting the riveted joint shown in Fig. 7 would comprise a hollow cylindrical sleeve, the hollow of which has a diameter substantially equal to the diameter of the rivet head 29. Within this sleeve, a rivet heading element would be embraced, the heading element being recessed within the sleeve so that, as the rivet is driven upwardly as shown, the heading of the shank 28 will begin to occur as the sheets are counter-sunk. The edges of the sleeve will abut the sheet 26 to permit the counter-sinking of the several sheets at the same time, and as the rivet is raised during the counter-sinking process, the top end of the shank will come in contact with the rivet heading element to accomplish the heading thereof.

Fig. 8 shows a riveted joint involving the same method as proposed for Fig. 7, and wherein an additional washer 32, of harder material than the sheets, if desired, would be applied to make the final joint more rigid. The other elements shown in Fig. 8 are the same as those of Fig. 7.

From the above description it will be appreciated that this invention provides means for effecting flush riveted joints in a single riveting operation, forming the counter-sink in the metal sheets as part of the riveting operation. It is known that the prior art shows riveted joints with somewhat similar characteritics to the ultimate joint of this invention, but the method of fabrication of such prior joints involves pre-forming of the rivet holes and counter-sunk portions of the metal sheets. Preferably, rivet holes are drilled upon assembly of the elements to be joined in order to assure proper alignment thereof. With the necessity of pre-forming operations, the rivet holes and counter-sinks in the metal sheets would necessarily have to be accomplished before the assembling and before the riveting operations, which would permit of inaccuracies in alignment which are wholly overcome by the methods herein outlined. Likewise, particularly in the rivet form of Figs. 2 to 4, inclusive, the rivet head wholly embraces the counter-sink portions of the sheets, thereby affording additional protection to the sheets and giving a riveted joint of unusually clean and neat appearance.

It will be appreciated in the above discussion that the nature of the material with which the method of this invention is concerned is such that the cutting of counter-sunk recesses for the rivets is out of the question, due to the gauge thickness of the material whereupon press counter-sinking is necessary.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

What is claimed is:

1. The method of riveting a plurality of flat metal sheets which consists in forming a rivet hole in each sheet, inserting through said holes a rivet having a head, applying pressure to the sheet metal surrounding the rivet to deform said rivet head and to counter-sink the sheet metal surrounding the rivet to lie adjacent the deformed rivet head, and in heading the rivet shank to fill the counter-sunk sheet metal and to lie flush with the outer surface of said sheet metal.

2. The method of press-counter-sinking and flush riveting flat thin metal sheets having aligned rivet holes which comprises inserting an oval headed rivet through the holes, applying a bucking member having a substantially hemispherical recess over the oval rivet head, and driving the rivet shank so that the rivet head is driven into said hemi-spherical recess, and in further driving the rivet so that the edges of the metal sheets are conically deformed to conform with the inner face of the rivet head and so that the headed shank fills the concave conically deformed sheet, the surface of the headed shank finally lying flush with the body of the metal sheet.

STANLEY I. VAUGHN.
EDWIN N. FABING.